(12) United States Patent
Takashima et al.

(10) Patent No.: US 9,522,352 B2
(45) Date of Patent: Dec. 20, 2016

(54) NANOFIBER STRUCTURAL BODY AND COLLECTING APPARATUS USING THE NANOFIBER STRUCTURAL BODY, AND METHOD OF PRODUCING THE NANOFIBER STRUCTURAL BODY

(71) Applicant: CANON KABUSHIKI KAISHA, Tokyo (JP)

(72) Inventors: Kenji Takashima, Tokyo (JP); Tetsuo Hino, Yamato (JP); Kazuhiro Yamauchi, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/662,500

(22) Filed: Mar. 19, 2015

(65) Prior Publication Data

US 2015/0273366 A1 Oct. 1, 2015

(30) Foreign Application Priority Data

Mar. 28, 2014 (JP) .................................. 2014-068823

(51) Int. Cl.
  *B01D 46/00* (2006.01)
  *B01D 29/58* (2006.01)
  *D01D 5/00* (2006.01)

(52) U.S. Cl.
  CPC ........... *B01D 29/58* (2013.01); *B01D 46/0024* (2013.01); *D01D 5/0084* (2013.01); *D01D 5/0092* (2013.01)

(58) Field of Classification Search
  CPC ....... B01D 39/18; B01D 39/86; B01D 39/163; B01D 46/01–46/02; B01D 46/10; B01D 46/521; B01D 46/546; B01D 46/523; B01D 46/2411

(Continued)

(56) References Cited

U.S. PATENT DOCUMENTS

2003/0037675 A1\* 2/2003 Gillingham ........ B01D 39/1623
  95/280
2003/0106294 A1\* 6/2003 Chung ................. B01D 39/086
  55/486

(Continued)

FOREIGN PATENT DOCUMENTS

JP 2012-219384 A 11/2012
JP 2012-223254 A 11/2012

OTHER PUBLICATIONS

Takashima et al., U.S. Appl. No. 14/662,892, filed Mar. 19, 2015.

(Continued)

*Primary Examiner* — Jason M Greene
*Assistant Examiner* — Karla Hawkins
(74) *Attorney, Agent, or Firm* — Fitzpatrick, Cella, Harper & Scinto (57) ABSTRACT

Based on an electrospinning method, a layer A formed of a polymer continuous phase is formed by: setting a potential difference between an ejection portion configured to eject a polymer solution and a collecting portion configured to collect the polymer nanofibers to a voltage value at which the polymer nanofibers can be spun; and setting the potential of the collecting portion to a low value with respect to a ground potential. Next, a layer B formed of polymer nanofibers and a polymer continuous phase is formed by increasing the potential of the collecting portion without stopping the application of voltages to the ejection portion and the collecting portion. Further, a layer C formed of polymer nanofibers is formed by increasing the potential of the collecting portion without stopping the application of the voltages to the ejection portion and the collecting portion.

12 Claims, 5 Drawing Sheets

(58) Field of Classification Search
IPC .............................. B01D 39/18,39/86, 39/163
See application file for complete search history.

(56) References Cited

U.S. PATENT DOCUMENTS

| | | | |
|---|---|---|---|
| 2004/0265210 A1* | 12/2004 | Shinohara | B01J 29/046 |
| | | | 423/447.3 |
| 2010/0181249 A1* | 7/2010 | Green | B01D 39/1623 |
| | | | 210/493.1 |
| 2015/0218324 A1 | 8/2015 | Hino et al. | |
| 2015/0273377 A1 | 10/2015 | Takashima et al. | |
| 2015/0273812 A1 | 10/2015 | Takashima et al. | |

OTHER PUBLICATIONS

Takashima et al., U.S. Appl. No. 14/661,313, filed Mar. 18, 2015.
Hino et al., U.S. Appl. No. 14/603,782, filed Jan. 23, 2015.

\* cited by examiner

NANOFIBER STRUCTURAL BODY AND COLLECTING APPARATUS USING THE NANOFIBER STRUCTURAL BODY, AND METHOD OF PRODUCING THE NANOFIBER STRUCTURAL BODY

BACKGROUND OF THE INVENTION

Field of the Invention

The present invention relates to a polymer nanofiber structural body and a collecting apparatus using the structural body, and a method of producing the structural body.

Description of the Related Art

Industrial utilization of fine particles has become active. Meanwhile, a collecting apparatus (separator) for collecting fine particles scattered in air or dispersed in a liquid has been needed. In recent years, a polymer nanofiber structural body in which polymer nanofibers are integrated and three-dimensionally entangled with each other typified by a polymer nanofiber sheet has been attracting attention as a material for the collecting apparatus.

Unlike general fibers to be used in a nonwoven fabric and the like, each of the polymer nanofibers has a diameter of several microns or less. Accordingly, the polymer nanofiber structural body is drastically superior to a structural body including the general fibers because of the following reason. Even when the polymer nanofibers are integrated, an enormous specific surface area, a nanosize continuous pore structure, and a low density are obtained. Accordingly, new functions such as a mechanical strength, reactivity, electrical and optical characteristics, and the permeability of the inside of the structural body can be imparted. In particular, when the pore structure is utilized, a pore diameter of the order of submicrons is obtained and hence the pore structure is suitable for the collection of fine particles. Further, each of the polymer nanofibers uses an organic compound as a parent material and hence is lightweight. In addition, the polymer nanofibers can be produced with ease and at a low cost.

The polymer nanofibers are often used while being adhered to a support. However, the polymer nanofibers are porous and hence sufficient adhesiveness is not obtained at an interface with the support in some cases. When the adhesiveness between the polymer nanofibers and the support is bad, the polymer nanofibers may peel off the support upon rounding or bending of the polymer nanofibers together with the support at the time of the manufacture of the collecting apparatus. Japanese Patent Application Laid-Open No. 2012-219384 discloses a method involving mixing nanobeads at the time of the formation of the polymer nanofibers to improve the interfacial adhesiveness between the polymer nanofibers and the support.

SUMMARY OF THE INVENTION

According to one aspect of the present invention, there is provided a polymer nanofiber structural body, including:
a layer A formed of a polymer continuous phase;
a layer B formed of polymer nanofibers and a polymer continuous phase, which partially fills a space between the polymer nanofibers; and
a layer C formed of polymer nanofibers,
the layer A, the layer B, and the layer C being stacked in the stated order,
in which:
polymer abundance ratios of the layer A, the layer B, and the layer C satisfy a relationship of (polymer abundance ratio of layer A)>(polymer abundance ratio of layer B)>(polymer abundance ratio of layer C);
the layer C has an average pore diameter of 10 nm or more and 50,000 nm or less;
the polymer continuous phase of the layer A, the polymer nanofibers and polymer continuous phase of the layer B, and the polymer nanofibers of the layer C include the same polymer material; and
the polymer continuous phase of the layer A is continuous with the polymer continuous phase of the layer B, and at least part of the polymer nanofibers of the layer B are continuous with the polymer nanofibers of the layer C.

In addition, according to another aspect of the present invention, there is provided a method of producing a polymer nanofiber structural body by using an electrospinning method,
the method including:
forming a layer A formed of a polymer continuous phase by setting a potential of an ejection portion configured to eject a polymer solution to a positive potential and a potential of a collecting portion to a negative potential with respect to a ground potential, followed by application of a droplet of the polymer solution to the collecting portion;
subsequent to the forming a layer A, forming a layer B formed of polymer nanofibers and a polymer continuous phase by increasing at least the potential of the collecting portion, followed by application of a droplet of the polymer solution and the polymer nanofibers onto the layer A; and
subsequent to the forming a layer B, forming a layer C formed of polymer nanofibers by increasing at least the potential of the collecting portion, followed by deposition of the polymer nanofibers onto the layer B.

In addition, according to still another aspect of the present invention, there is provided an apparatus for collecting fine particles, including the polymer nanofiber structural body according to the one aspect of the present invention, in which the polymer nanofiber structural body is formed into a shape of a cylinder so that the layer C is positioned on an inner side of the cylinder.

Further, according to yet another aspect of the present invention, there is provided a polymer nanofiber structural body, including:
a polymer serving as a continuous phase; and
polymer nanofibers,
in which:
the polymer nanofiber structural body continuously includes a layer A, a layer B, and a layer C stacked in the stated order;
the layer A includes the polymer serving as a continuous phase and is free of the polymer nanofibers;
the layer B includes the polymer serving as a continuous phase and includes the polymer nanofibers;
the layer C is free of the polymer serving as a continuous phase and includes the polymer nanofibers;
the polymer serving as a continuous phase and the polymer nanofibers include the same polymer material;
the layer C includes the polymer nanofibers extending from the layer B; and
the layer C has an average pore diameter of 10 nm or more and 50,000 nm or less.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The method disclosed in Japanese Patent Application Laid-Open No. 2012-219384 improves the adhesiveness between the polymer nanofibers and the support. However, the pore structure of a polymer nanofiber layer is clogged with the nanobeads and hence a desired pore structure is not obtained in some cases.

An object of the present invention is to provide the following polymer nanofiber structural body: while the structural body maintains a desired pore structure, the structural body has good adhesiveness between its support and polymer nanofibers, and does not cause the peeling of the polymer nanofibers even when a stress due to bending or the like is applied. Another object of the present invention is to provide a collecting apparatus excellent in fine particle-collecting characteristic by using such polymer nanofiber structural body.

Figure 1:
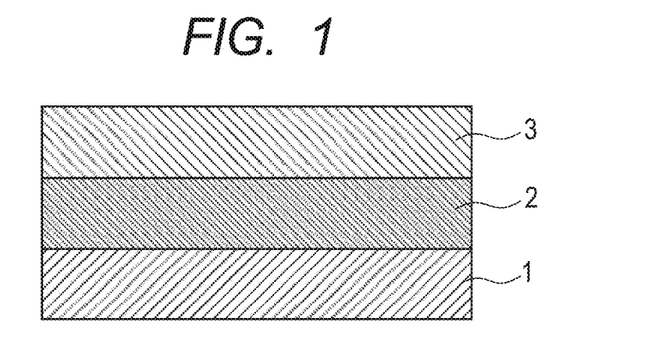
FIG. 1 is a sectional view along a stacking direction schematically illustrating the structure of a polymer nanofiber structural body of the present invention.

A polymer nanofiber structural body of the present invention includes a layer A 1, a layer B 2, and a layer C 3 stacked in the stated order as illustrated in FIG. 1. In addition, the layer A 1 is formed of a polymer continuous phase, the layer B 2 is formed of polymer nanofibers and a polymer continuous phase, which partially fills a space between the polymer nanofibers, and the layer C 3 is formed of polymer nanofibers. In addition, all of the polymer continuous phase of the layer A 1, the polymer nanofibers and polymer continuous phase of the layer B 2, and the polymer nanofibers of the layer C 3 are formed of the same polymer material. Further, the polymer continuous phase of the layer A 1 is continuous with the polymer continuous phase of the layer B 2, and at least part of the polymer nanofibers of the layer B 2 are continuous with the polymer nanofibers of the layer C 3. Herein, the expression "formed of" is used in the same meaning in the case where a layer includes one of the polymer continuous phase and a polymer nanofiber layer, and does not include the other of the two. An additive of a kind different from that of the polymer material for forming the layer such as powder may be incorporated.

The present invention is hereinafter described in detail by way of an embodiment of the present invention. It is to be noted that a known or well-known technology in the art is applied to a portion not particularly illustrated or described in the specification.

[Method of Producing Polymer Nanofiber Structural Body]

The polymer nanofiber structural body of the present invention is produced by utilizing an electrospinning method. The electrospinning method is a method involving forming polymer nanofibers in a state in which a high voltage is applied between a polymer solution in a syringe and a collector. When the method is adopted, the solution extruded from the syringe is provided with charge to scatter in an electric field. However, as the time lapses, a solvent in the scattered solution evaporates. As a result, a thinned solute appears. The thinned solute serves as a polymer nanofiber to adhere to the collector such as a substrate.

The electrospinning method has the following advantages (i) to (iii):
(i) various polymers can be spun into fiber shapes;
(ii) the control of a fiber shape is relatively easy and a fiber having a fiber diameter of from several nanometers to several tens of micrometers can be easily obtained; and
(iii) a production process is easy.

Figure 2:
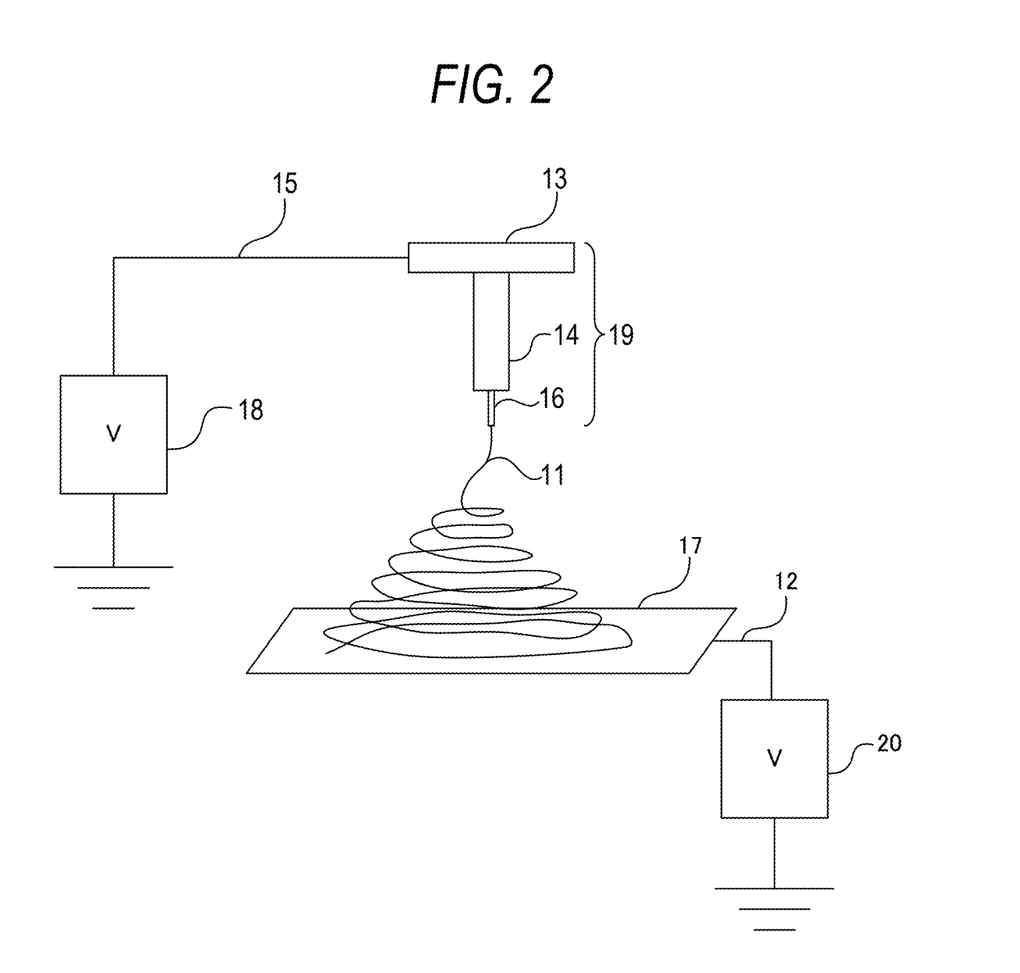
FIG. 2 is a view schematically illustrating the construction of a production apparatus for producing a polymer nanofiber of the present invention.

FIG. 2 illustrates an example of a production apparatus for producing polymer nanofibers based on the electrospinning method to be used in the present invention. The production apparatus illustrated in FIG. 2 specifically adopts a method involving extruding a polymer solution stored in a storage tank 14 from a spinning nozzle (ejection portion) 16. It is to be noted that the polymer solution extruded from the spinning nozzle 16 scatters in all directions and hence a polymer nanofiber layer in which spun polymer nanofibers are three-dimensionally entangled with each other is naturally produced.

Next, the constituent members of the production apparatus of FIG. 2 are described. The storage tank 14 for storing the polymer solution is arranged through a connecting portion 13. It is to be noted that the connecting portion 13 is electrically connected to a high-voltage power source (upper power source) 18 through a wiring 15. In addition, the connecting portion 13 and the storage tank 14 are each a constituent member of a head 19. A collector (collecting portion) 17 in which the spun polymer nanofibers are collected is arranged so as to face the head 19 with a certain interval therebetween. It is to be noted that the collector 17 is electrically connected to a high-voltage power source (lower power source) 20 through a wiring 12.

The polymer solution is extruded from the tank 14 to the spinning nozzle 16 at a constant speed. Under normal conditions, the collector 17 is connected to the ground and a voltage of from 1 kV to 50 kV is applied to the spinning nozzle 16. When electrical attraction exceeds the surface tension of the polymer solution, a jet 11 of the polymer solution is jetted toward the collector 17. At this time, a solvent in the jet 11 gradually volatilizes, and upon arrival of the jet at the collector 17, the corresponding polymer nanofibers are obtained. Here, the polymer solution set to a condition under which the solution is turned into nanofibers is introduced into the tank 14 and spun. It is to be noted that a material to be stored in the tank 14 upon spinning is not limited to the polymer solution and a molten polymer heated to its melting point or more may be utilized.

In general spinning by the electrospinning method, the polymer nanofibers are integrated with their length directions irregularly directed. In addition, structures such as the fiber diameters and fiber abundance ratio of the polymer nanofibers, and the average pore diameter and porosity of the polymer nanofiber layer largely depend on the kind of a polymer, a mixed additive and its ratio, the viscosity of the polymer solution, a temperature and humidity at the time of the production, and spinning conditions. Of the spinning conditions, in particular, the speed at which the polymer solution is extruded from the tank 14 to the spinning nozzle 16 and the voltage values of the power sources largely affect the structures. A polymer nanofiber layer having a desired pore structure is obtained by adjusting those parameters.

The layers A to C of the polymer nanofiber structural body of the present invention can be continuously formed by adjusting the potential of the collector 17 in a process for the production of the polymer nanofibers by the electrospinning method. This is because of the following reason: in the electrospinning method, even when a potential difference between the spinning nozzle 16 and the collector 17 is the same, the potential of the collector 17 shows different kinds of behavior in the case where the potential is a negative potential with respect to a ground potential (zero) and in the case where the potential is the ground potential.

Here, a condition under which the nanofibers can be spun, which is achieved by connecting the collector 17 to the ground to set its potential to the ground potential and setting the potential of the spinning nozzle 16 to a positive potential with respect to the ground potential, is changed as follows: the potentials of the spinning nozzle and the collector 17 are reduced while the potential difference between the spinning nozzle 16 and the collector 17 is kept constant. That is, when the potential of the collector 17 becomes a negative potential with respect to the ground potential, while the polymer nanofibers deposit on the collector 17, the amount of the nanofibers arriving at the collector 17 while containing the solvent of the polymer solution gradually increases. In addition, when the potential of the collector 17 is reduced to a predetermined low potential, the nanofibers arriving at the collector 17 in a state of containing a large amount of the solvent while flying out of the syringe with their shapes maintained become dominant.

Details about a mechanism for the foregoing have not been elucidated but are considered to be as described below. Under normal conditions, when a value for an applied voltage is set to zero by connecting the collector 17 to the ground, the potential of a peripheral member of the collector 17 is indirectly identical to the ground potential. Accordingly, forces act on the nanofibers drawn from the syringe in various directions in the space by virtue of the charge of each of the nanofibers and an action by the potential difference. Accordingly, the nanofibers widely scatter in the space and arrive at the collector 17 over a long time period. Under normal conditions, for example, a voltage to be applied to the spinning nozzle 16 is optimized so that the solvent may sufficiently volatilize at the time of the arrival at the collector 17 in a state in which the collector 17 is connected to the ground as described above. In the present invention, a large minus voltage with respect to the ground potential is applied to the collector 17 while the potential difference in the case where the optimization is achieved is kept (a plus voltage to be applied to the spinning nozzle 16 is reduced as compared to a normal one). When such approach is employed, the speed of the jet 11 of the polymer solution upon ejection from the syringe by the potential difference remains substantially unchanged and the fiber diameters are substantially the same. Meanwhile, the voltage to be applied to the collector 17 is minus and its potential becomes clearly lower than that of its surroundings, and hence a force for attracting the nanofibers to the collector 17 acts. Accordingly, the time period for which the nanofibers drift in the space shortens and hence the nanofibers arrive at the collector 17 before a time period needed for the sufficient volatilization lapses. As the absolute value of the minus voltage to be applied to the collector 17 increases, the force by which the nanofibers are attracted to the collector 17 enlarges, and hence the amount of the nanofibers that arrive at the collector within a short time period increases. In other words, the nanofibers arriving at the collector 17 while containing a large amount of the solvent become dominant. The foregoing is a conceivable mechanism. When the nanofibers in a state of containing a large amount of the solvent are applied as droplets onto the collector 17 and integrated, the nanofibers lose their shapes again to turn into the polymer solution and the solution spreads on the collector 17. Accordingly, the polymer continuous phase is formed and the phase serves as the layer A.

Subsequently, the negative potential of the collector 17 is increased to a plus side (the minus voltage is reduced) in a state in which the potential difference between the spinning nozzle 16 and the collector 17 is set to a potential difference at which the nanofibers are formed. As a result, the amount of the nanofibers arriving at the collector 17 while containing a large amount of the solvent reduces as compared to that at the time of the formation of the layer A. Thus, some nanofibers lose their shapes to serve as droplets of the polymer solution to form the polymer continuous phase, others deposit as polymer nanofibers with their shapes maintained. The resultant serves as the layer B in which the polymer nanofibers and the polymer continuous phase are mixed.

Subsequently, the negative potential of the collector 17 is further increased to the plus side (the minus voltage is reduced or is set to the ground potential) in a state in which the potential difference between the spinning nozzle 16 and the collector 17 is set to the potential difference at which the nanofibers are formed. As a result, the amount of the nanofibers arriving at the collector 17 while containing a large amount of the solvent becomes substantially zero, and a portion in which the nanofibers are integrated is formed. The portion serves as the layer C.

In the present invention, the step of forming the layer A, the step of forming the layer B, and the step of forming the layer C are continuously performed. That is, the values for the applied voltages are changed step by step without the interruption of the application of the voltages to the spinning nozzle 16 and the collector 17. As a result, the polymer nanofibers and the droplets of the polymer solution are continuously applied onto the layer A to form the layer B. Further, the polymer nanofibers are applied onto the layer B to continuously form the layer C. Accordingly, the following structure is obtained: the polymer continuous phase of the layer A is continuous with the polymer continuous phase of the layer B, and at least part of the polymer nanofibers of the layer B are continuous with the polymer nanofibers of the layer C.

Basically, the potential difference between the spinning nozzle 16 and the collector 17 in each of the step of forming the layer A, the step of forming the layer B, and the step of forming the layer C only needs to be such that the polymer solution is ejected from the spinning nozzle 16 in a nanofiber shape. Therefore, the potential differences in the respective steps may be uniform or may be different from one another. In addition, the potentials of the spinning nozzle 16 and the collector 17 in each step may be constant or may be gradually increased in the step. As long as the potential difference and the potentials are constant, the form of the layer to be formed in each step is uniform in its thickness direction. In addition, when the potentials are increased in the step of forming the layer B, a ratio between the polymer nanofibers and the polymer continuous phase, and the pore structure can be biased in its thickness direction. When the potentials or the voltages are fluctuated in the step of forming the layer C, the pore structures of the polymer nanofibers can be biased. In view of the ease of operation, the following method is preferred: the potential difference between the spinning nozzle 16 and the collector 17 is made constant in all steps, and the potentials of the spinning nozzle 16 and the collector 17 are fluctuated step by step.

In the present invention, as long as the polymer nanofiber structural body has a desired structure, the following treatment may be performed after the integration of the nanofibers as required: another substance is added to the surface or inside of each nanofiber, or a chemical reaction is induced. Examples of a method for the treatment include a method involving performing heat treatment, a method involving bringing a compound into contact with the nanofiber based on a wet or dry process, and a method involving performing both of the foregoing. It is to be noted that an operation after the integration of the nanofibers is preferably performed at a temperature equal to or less than the melting point of each of the nanofibers.

For example, when layers like the layer A, the layer B, and the layer C are separately produced and bonded to provide a nanofiber structural body, there is no continuity between the layer A and the layer B or between the layer B and the layer C, and hence peeling may occur from the vicinity of an interface between adjacent layers upon application of a stress. When the layers A to C are continuously formed like the present invention, there is continuity between the layer A and the layer B, and there is also continuity between the layer B and the layer C as described above, and hence no peeling occurs even upon application of the stress. In addition, the following method is conceivable: after a portion including the polymer nanofibers has been produced, part of the portion is melted to produce the layer B. However, it is difficult to apply a temperature locally, and even when one wishes to utilize the portion of the polymer nanofibers as a porous material, the portion deforms and a desired pore diameter is not obtained in some cases.

[Polymer Material]

In the present invention, the polymer nanofibers and the polymer continuous phase are each formed of at least an organic polymer component. A conventionally known polymer material can be used as the organic polymer, and one kind of such materials may be used alone, or two or more kinds thereof may be used in combination. In addition, a material containing a fine particle or a conventionally known filler can be used as the organic polymer, and the polymer can be formed by appropriately combining such materials.

The polymer material according to the present invention is not particularly limited as long as the material forms a fibrous structure. Specific examples thereof include: an organic material typified by a resin material; and a hybrid material of the organic material and an inorganic material such as silica, titania, or a clay mineral.

Here, examples of the polymer material may include: a fluorine-containing polymer (such as tetrafluoroethylene or polyvinylidene fluoride (PVDF); the fluorine-containing polymer may include a copolymer of a fluorine-containing polymer and any other monomer (such as a copolymer of PVDF and hexafluoropropylene (PVDF-HFP))); a polyolefin-based polymer (such as polyethylene or polypropylene); polystyrene (PS); a polyarylene (aromatic polymer such as polyparaphenylene oxide, poly(2,6-dimethylphenylene oxide), or polyparaphenylene sulfide); polyimide; polyamide; polyamide imide; polybenzimidazole; a modified polymer obtained by introducing a sulfonic group ($-SO_3H$), a carboxyl group ($-COOH$), a phosphoric group, a sulfonium group, an ammonium group, or a pyridinium group into a polyolefin-based polymer, polystyrene, polyimide, or a polyarylene (aromatic polymer); a modified polymer obtained by introducing a sulfonic group, a carboxyl group, a phosphoric group, a sulfonium group, an ammonium group, or a pyridinium group into a skeleton of a fluorine-containing polymer; a polybutadiene-based compound; a polyurethane-based compound (including an elastomer-like compound or a gel-like compound); a silicone-based compound; polyvinyl chloride; polyethylene terephthalate; nylon; polyarylate and a biodegradable polymer (such as polycaprolactone (PCL) or polylactic acid); a polyether (such as polyethylene oxide (PEO) or polybutylene oxide); and a polyester (PES) (such as polyethylene terephthalate (PET)).

It is to be noted that one kind of the polymer materials listed above may be used alone, or two or more kinds thereof may be used in combination. In addition, in the polymer material other than the polyolefin-based polymer, polystyrene, polyimide, the polyarylene, and the fluorine-containing polymer, there may be used a modified polymer obtained by introducing a sulfonic group, a carboxyl group, a phosphoric group, a sulfonium group, an ammonium group, or a pyridinium group. Further, a copolymer obtained by copolymerizing a plurality of kinds of monomers may be used. In addition, in the case of a polymer material that is hardly caused to melt such as polyimide, polyamide, polyamide imide (PAI), or polybenzimidazole (PBI), the polymer material may be used in combination with, for example, a thermoplastic resin.

Of the polymer materials, a water-resistant polymer material is preferred from the viewpoint of durability against moisture in the case of, for example, use in the air. In addition, out of the polymer materials, a polymer material having a melting point of 80° C. or more is preferred from the viewpoint of the prevention of heat generation due to use in a high-temperature region or contact with any other substance.

Examples of the inorganic material that can be used together with the organic polymer include oxides of metal materials selected from Si, Mg, Al, Ti, Zr, V, Cr, Mn, Fe, Co, Ni, Cu, Sn, and Zn. More specific examples thereof may include metal oxides such as silica ($SiO_2$), titanium oxide, aluminum oxide, alumina sol, zirconium oxide, iron oxide, and chromium oxide. In addition, a clay mineral such as montmorillonite (MN) may be used. Here, an inorganic material is preferably incorporated into each of the polymer nanofibers from the viewpoint of an improvement in durability because a mechanical strength tends to increase significantly upon joining of the polymer nanofibers.

In addition, the case where a repeating structure forming each of the polymer nanofibers and the polymer continuous phase includes an imide structure is preferred because heat resistance and a mechanical strength tend to be high by virtue of its rigid and strong molecular structure.

[Polymer Nanofiber Structural Body]

As described in the foregoing, the polymer nanofiber structural body of the present invention has the layer A formed of the polymer continuous phase, the layer B formed of the polymer nanofibers and the polymer continuous phase, and the layer C formed of the polymer nanofibers.

In the present invention, each of the polymer nanofibers serving as constituent members for the layer B and the layer C has a length longer than its thickness. In the present invention, the average diameter (average fiber diameter) of the polymer nanofibers serving as an indicator of the thickness, which is not particularly limited, is preferably 1 nm or more and less than 10,000 nm. In particular, in order to obtain a polymer nanofiber structural body having a high specific surface area, the average fiber diameter is more preferably less than 1,500 nm because the number of fibers per space is limited when the fiber diameters are excessively large. It is to be noted that when the average fiber diameter is less than 1 nm, the polymer nanofibers are difficult to handle from the viewpoint of the production of the polymer nanofiber structural body, and the average fiber diameter is preferably 50 nm or more from the viewpoint of the handling of the polymer nanofibers because the polymer nanofibers tend to be easy to handle.

In the present invention, the sectional shapes of the polymer nanofibers are not particularly limited, and specific examples of the shapes include a circular shape, an elliptical shape, a quadrangular shape, a polygonal shape, and a semicircular shape. It is to be noted that the sectional shapes of the polymer nanofibers may not be such accurate shapes as listed above, and each of the polymer nanofibers may have different shapes at arbitrary sections.

Here, when it is hypothesized that the polymer nanofibers have shapes of columns, the diameters of circles serving as the sections of the columns correspond to the fiber diameters of the polymer nanofibers. In addition, when the polymer nanofibers do not have shapes of columns, the fiber diameters of the polymer nanofibers refer to the lengths of the longest straight lines passing centers of gravity in the sections of the polymer nanofibers. It is to be noted that in the present invention, the length of each of the polymer nanofibers is typically 10 or more times as long as its fiber diameter.

The shapes of the polymer nanofibers (such as the sectional shapes of the fibers and the fiber diameters) can be confirmed by direct observation based on measurement with a scanning electron microscope (SEM) or laser microscope.

A polymer abundance ratio is available as a quantitative indicator of the local structure of the nanofiber structural body. The term "polymer abundance ratio" as used in the present invention refers to the ratio of a spatial area occupied by the polymer material per unit area, and in the present invention, the polymer abundance ratios of the layer A, the layer B, and the layer C satisfy a relationship of (polymer abundance ratio of layer A)>(polymer abundance ratio of layer B)>(polymer abundance ratio of layer C). It is to be noted that in each of the layer A, the layer B, and the layer C, a local polymer abundance ratio may be constant or may change in its thickness direction.

The polymer abundance ratio of the layer A is preferably 90% or more, desirably 97% or more, and may be 100% from the viewpoint of its strength in the case of use as a support. In addition, the thickness of the layer A, which is not particularly limited, is preferably 100 nm or more and 500 μm or less, and is more preferably more than the average fiber diameter of the layer C and equal to or less than 200 μm. When the thickness of the layer A is less than 100 nm, the strength of the layer A upon its use as the support or its adhesiveness with the polymer nanofibers of the layer B and the layer C may reduce. On the other hand, when the thickness exceeds 500 μm, operability in, for example, the case where the polymer nanofiber structural body of the present invention is used after having been adhered to any other material reduces, which is not preferred.

The thickness of the layer B, which is not particularly limited, is preferably 100 nm or more and 500 μm or less, more preferably, more than the average fiber diameter of the layer C and equal to or less than 200 μm. When the thickness of the layer B is less than 100 nm, its adhesiveness with the layer C may reduce. On the other hand, when the thickness exceeds 500 μm, the operability in, for example, the case where the polymer nanofiber structural body is used after having been adhered to any other material reduces, which is not preferred.

In addition, the polymer abundance ratio in the layer B, which is lower than that in the layer A and higher than that in the layer C, is preferably 70% or more and less than 97%. The polymer abundance ratio in the layer C only needs to be lower than that in the layer B, and is preferably 1% or more and less than 70%.

With regard to the interface between the layer A and the layer B, a portion in which polymer nanofibers maintaining their shapes can be observed for the first time in a direction from the inside of the layer A toward a side in which the polymer nanofibers are present is defined as the starting point of the layer B. In addition, the layer C only needs to satisfy the following conditions: no polymer continuous phase is present and the polymer nanofibers are integrated in the layer, and the layer includes at least part of the polymer nanofibers extending from the layer B.

When the polymer nanofiber structural body of the present invention is placed in the air, air is present in a void in which no polymer nanofiber or polymer continuous phase is present. In the polymer nanofiber structural body of the present invention, a plurality of adjacent voids where no polymer nanofiber or polymer continuous phase is present are referred to as "pore", and the length of the smallest portion in an unspecified pore is referred to as "partial pore diameter." When a plurality of polymer nanofibers are in close contact with each other and hence even a slight gap is not produced, the voids are not referred to as "pore" and hence the partial pore diameter takes a value larger than zero. The term "average pore diameter" as used in the present invention refers to the average of partial pore diameters in a specific space. The average pore diameter is not particularly limited as long as the polymer nanofiber structural body maintains its peeling resistance. However, the average pore diameter of the layer C is 10 nm or more and 50,000 nm or less. In particular, when the layer is used as a separator for a substance of a submicron size, the average pore diameter is preferably 10,000 nm or less. When the average pore diameter of the layer C is less than 10 nm, a pore may be clogged by a capillary phenomenon upon adhesion of moisture in a gas as a droplet. On the other hand, when the average pore diameter exceeds 50,000 nm, the space is so large as compared to the diameters of the polymer nanofibers that the strength of the layer reduces, and its function of collecting fine particles and the like reduces, which is not preferred.

In the polymer nanofiber structural body, the form of the integration of the polymer nanofibers in the layer C may be random or may be in such an oriented state that the number of polymer nanofibers whose length directions are directed toward a specific direction is large.

The thickness of the layer C, which is not particularly limited, is preferably equal to or more than the thickness of the layer B and equal to or less than 1,000 μm, more preferably more than the average fiber diameter of the layer C and equal to or less than 200 μm. When the thickness of the layer C is less than the thickness of the layer B, effects peculiar to the polymer nanofibers such as the collection of fine particles are hardly exhibited. When the thickness exceeds 1,000 μm, the operability in, for example, the case where the polymer nanofiber structural body is used after having been adhered to any other material reduces, which is not preferred.

The polymer nanofiber structural body of the present invention may be used alone or may be produced on the surface of a base material. The base material is by no means limited, and an organic material typified by a resin material, an inorganic material such as silica or titania, a metal material such as an aluminum foil, or a material obtained by hybridizing the organic material and the inorganic material may be used. In addition, the base material may change in the middle and may have a hollow structure or a porous structure. In the present invention, the layers A to C are continuously formed by controlling the potential of the collector, and hence a metal material whose potential can be easily controlled to the same potential as that of the collector is desirably used as the base material.

[Evaluation of Polymer Nanofiber Structural Body for its Structure]

The process in which the polymer nanofiber structural body of the present invention is produced by the electrospinning method can be visually confirmed as long as the fiber diameters are several hundreds of nanometers or more. In addition, the polymer nanofiber structural body itself can be confirmed by direct observation with a scanning electron microscope (SEM) or a laser microscope after its production irrespective of the sizes of the fiber diameters. Observation from a surface in a fracture surface is particularly effective in acquiring information about the manner in which the states of the polymer nanofibers and the polymer continuous phase change in a direction from the surface of the structural body toward its reverse surface. Cutting with a knife, cutting by irradiation with an argon beam, or the like is effective in shaping the fracture surface.

In addition, the average fiber diameter of the polymer nanofibers can be determined by: subjecting a fracture surface of the layer C to measurement with a SEM or a laser microscope; capturing the resultant image in image analysis software; and then measuring the widths of polymer nanofibers at 50 arbitrary points.

The polymer abundance ratio of the layer C can be calculated as described below. The fracture surface of the layer C is subjected to the measurement with the SEM or the laser microscope, and the resultant image is captured in the image analysis software and then binarized. Next, the image is cut and divided into a polymer nanofiber existing portion and a polymer nanofiber non-existing portion, and the area ratio of the polymer nanofiber existing portion is calculated. With regard to the layer A and the layer B, a magnitude relationship between the polymer abundance ratios of the layer A and the layer B, and a magnitude relationship between the polymer abundance ratios of the layer B and the layer C are determined by the observation of the image of a fracture surface of the polymer nanofiber structural body.

The average pore diameter of the polymer nanofibers of the layer C can be measured with a pore diameter distribution-evaluating apparatus employing a bubble point method or a BET method. In addition, the average pore diameter of the polymer nanofibers in a local range can be determined as described below. The fracture surface of the layer C is subjected to the measurement with the SEM or the laser microscope, and the resultant image is captured in the image analysis software. Then, the shortest length in each gap is measured for 50 arbitrary points and the average of the measured values is calculated.

A composition in the polymer nanofiber structural body can be confirmed by, for example, infrared spectroscopy, Raman spectroscopy, or X-ray spectroscopic analysis. The compositions of the layer A and layer C present on the surface of the polymer nanofiber structural body, and the layer B when the thickness of the layer A or the layer C falls within the allowable range of each analysis approach can be confirmed by analysis from the surface. In addition, when a fracture surface of the polymer nanofiber structural body is shaped, the compositions of the respective portions can be more clearly cut and divided, and confirmed by mapping measurement based on microscopic Raman spectroscopic analysis or X-ray spectroscopic analysis.

As described above, the layers A to C are continuously formed, and there is continuity between the layer A and the layer B, and there is also continuity between the layer B and the layer C. Accordingly, the polymer nanofibers of the present invention have good adhesiveness between themselves and hence there is no risk that part or the entirety thereof peel in the structural body even when a stress such as bending is applied. In addition, all the layers A to C of the polymer nanofiber structural body of the present invention are formed of the same material, and hence there is no risk that the deformation or breakage of an interface of the structural body occurs owing to a difference in coefficient of thermal expansion even when the structural body is used in an environment showing a large temperature change.

Accordingly, the polymer nanofiber structural body of the present invention can be a polymer nanofiber structural body having a high specific surface area that can be used over a long time period even when an external factor such as rubbing is applied, and hence the structural body can be suitably utilized as, for example, a material for collecting fine particles.

Figure 3:
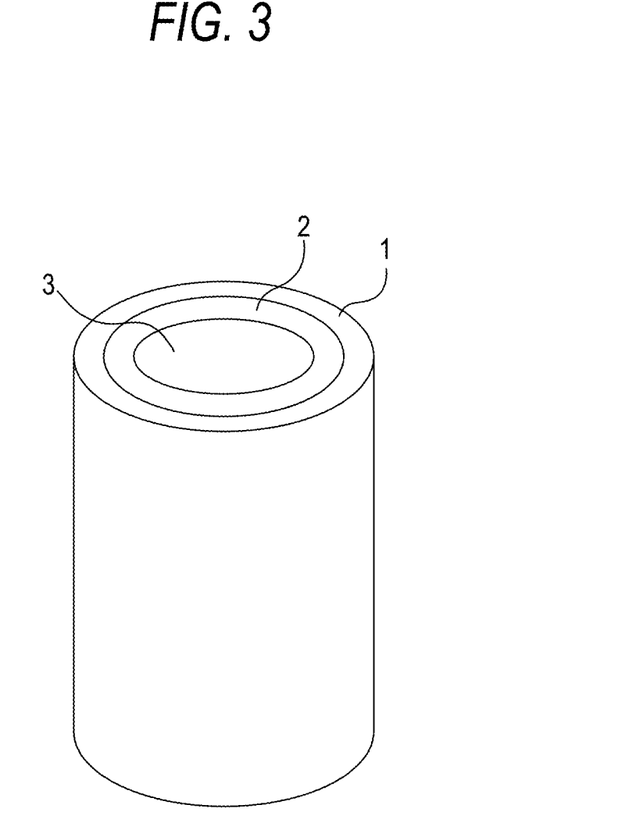
FIG. 3 is a perspective view schematically illustrating the form of the polymer nanofiber structural body in a collecting apparatus of the present invention.

FIG. 3 illustrates an example of a form upon use of the polymer nanofiber structural body of the present invention in an apparatus for collecting fine particles. As illustrated in FIG. 3, the polymer nanofiber structural body of the present invention is formed into a shape of a cylinder so that the layer A 1 may be positioned on the outer side of the cylinder, and a fluid is flowed into the layer C 3 on the innermost side from one end of the cylinder toward the other end thereof, whereby fine particles in the fluid are collected by the layer C 3.

EXAMPLES

The present invention is hereinafter described by way of Examples. However, the present invention is not limited to Examples. Table 1 shows the production conditions of Examples and Table 2 shows the results of the evaluations thereof.

Example 1

A polymer nanofiber structural body was produced by using an apparatus of an electrospinning system having a construction illustrated in FIG. 2. The used apparatus was NANON manufactured by MECC CO., LTD. A syringe with a metallic needle was used as the storage tank 14 for a polymer solution. An aluminum plate was used as the collector 17. A distance from a head in which the metallic needle (the spinning nozzle 16) was arranged to the collector 17 was a constant value of 30 cm.

Prepared as the polymer solution was a polymer solution obtained by dissolving a polyamide imide (PAI, VYLOMAX HR-13NX, manufactured by TOYOBO CO., LTD.) in dimethylformamide (DMF) so that a solid content concentration became 20 mass %. The solution was flowed into the syringe with the metallic needle. In addition, an aluminum foil was mounted as a base material for producing the polymer nanofiber structural body on the collector 17. In addition, the settings of the apparatus were adjusted so that the speed at which the polymer solution was extruded became 1 ml/hour.

As illustrated in Table 1, a voltage applied by the upper power source 18 to the spinning nozzle 16 was set to +10 kV, a voltage applied by the lower power source 20 to the collector 17 was set to −15 kV, and the polymer solution was ejected for 30 minutes. Next, without the turning-off of the upper power source 18 and the lower power source 20, the voltage applied to the spinning nozzle was changed to +13 kV, the voltage applied to the collector 17 was changed to −12 kV, and the polymer solution was ejected for 30 minutes. Further, without the turning-off of the upper power source 18 and the lower power source 20, the voltage applied to the spinning nozzle was changed to +20 kV, the voltage applied to the collector 17 was changed to −5 kV, and the polymer solution was ejected for 20 minutes. The polymer nanofiber structural body formed of the layer A, the layer B, and the layer C was obtained by such steps.

The polymer nanofiber structural body was divided into two equal parts and one of the parts was used for the observation of each layer. In order to shape a fracture surface, the polymer nanofiber structural body was cut with an argon beam along its thickness direction. The used apparatus was Cross-section Polishing manufactured by JEOL Ltd., and the treatment was performed at an applied voltage of 4 kV for a time period of 8 hours.

A laser microscope was utilized in the observation of each layer. The layer A, the layer B, and the layer C were observed in the stated order from a side closer to the collector, and a polymer continuous phase continuous with the layer A and the layer B, and polymer nanofibers continuous with the layer B and the layer C were observed. The polymer abundance ratios of the layer A, the layer B, and the layer C clearly satisfied a relationship of (polymer abundance ratio of layer A)>(polymer abundance ratio of layer B)>(polymer abundance ratio of layer C). Table 2 shows the thicknesses of the respective layers, and the average fiber diameter, average pore diameter, and polymer abundance ratio of the layer C.

(Peeling Resistance Evaluation)

An improvement in peeling resistance of the polymer nanofiber structural body in the present invention was confirmed by a bending test and a compressed air blowing test. It is to be noted that at the time of the tests, the aluminum foil as the base material was peeled from the polymer nanofiber structural body. At this time, the following method was employed: after the aluminum foil had been cooled to low temperature in liquid nitrogen, the aluminum foil side was peeled while a knife was brought into contact with the vicinity of a portion where the foil was in contact with the structural body.

<Bending Test>

Figure 4A:
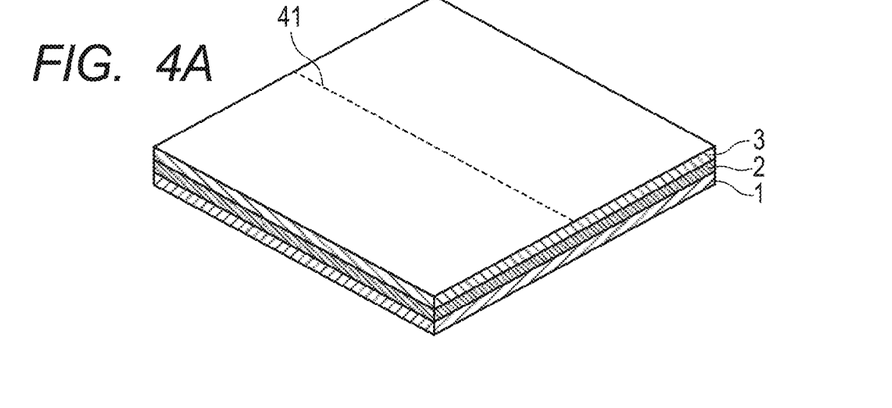
FIGS. 4A, 4B, 4C, 4D, 4E and 4F are views schematically illustrating the steps of a bending test in Examples of the present invention, FIG. 4A being a perspective view illustrating the axis of bending and FIGS. 4B to 4F being sectional views along the stacking direction of the polymer nanofiber structural body illustrating the steps.
Figure 4B:
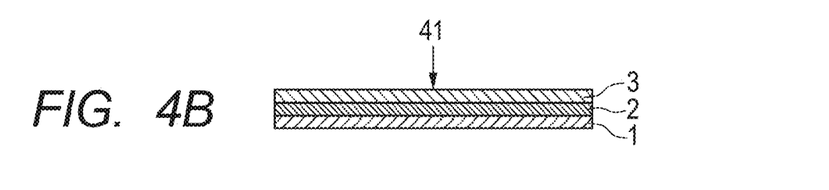
Figure 4C:
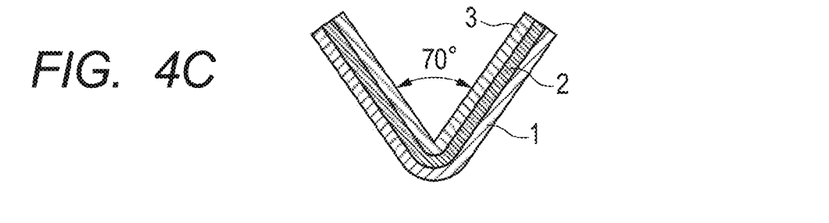
Figure 4D:
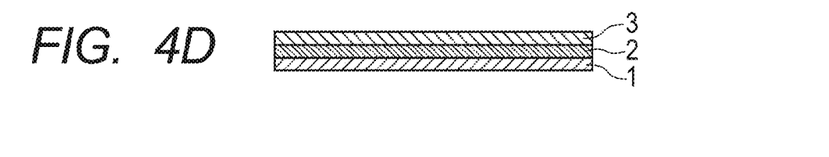
Figure 4E:
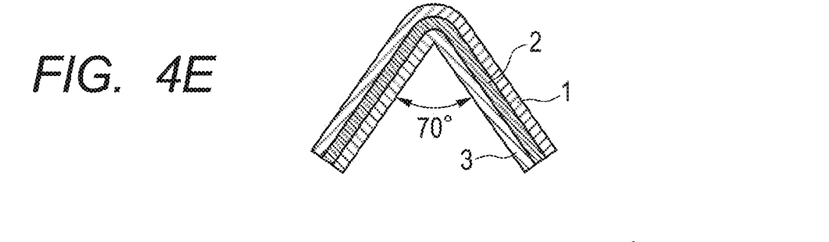
Figure 4F:
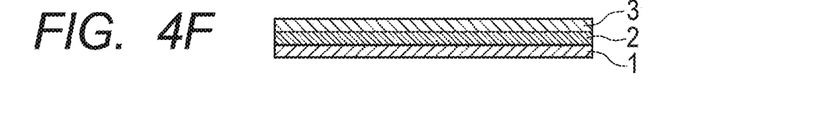

The bending test is a test for confirming whether peeling occurs after bending. As illustrated in FIG. 4A, the polymer nanofiber structural body is cut in its thickness direction into a predetermined size and defined as a sample for measurement. One fracture surface of the sample is defined as an observation surface, and an axis upon bending perpendicular to the fracture surface and parallel to the surface of the layer A or the layer C is defined as an axis 41. A state in which the polymer nanofiber structural body is flat (FIG. 4B) is defined as the initiation state of the bending test, and a bending angle at this time is defined as 0°. The structural body is bent about the axis 41 until the bending angle becomes 70° (FIG. 4C). Further, the bending angle is returned to 0° (FIG. 4D), the structural body is bent toward the opposite side until the bending angle becomes 70° (FIG. 4E), and the bending angle is returned to 0° again (FIG. 4F). The series of operations is defined as one set and the set is repeated 20 times. After the operations, the observation surface was observed with the laser microscope, and the case where no peeling occurred was judged as being good and the case where the peeling occurred was judged as being bad.

<Compressed Air Blowing Test>

The compressed air blowing test is a test for confirming whether peeling is caused by a method involving: producing a shape of a cylinder so that the layer A of the polymer nanofiber structural body may be positioned on the outer side of the cylinder; and blowing a compressed air against the cylinder. The polymer nanofiber structural body is formed into a shape of a cylinder having a diameter of 2 mm so that the layer A may be positioned on the outer side of the cylinder. When the polymer nanofiber structural body is extremely thin, an iron cylinder having a diameter of 2 mm is utilized as a support and the structural body is arranged so that the layer A may be brought into contact with the wall surface on the inner side of the cylinder. A compressed air is blown at 0.2 Pa for 5 seconds against the polymer nanofiber structural body having a shape of a cylinder from one end of the cylinder, and the presence or absence of the peeling is observed with the laser microscope. The case where no peeling occurs is judged as being good and the case where the peeling occurs is judged as being bad.

When the peeling resistance is good in each of the tests of this evaluation, a polymer nanofiber structural body in which no peeling is caused by an operation that applies a stress such as bending can be provided. Table 2 shows the results.

Figure 5:
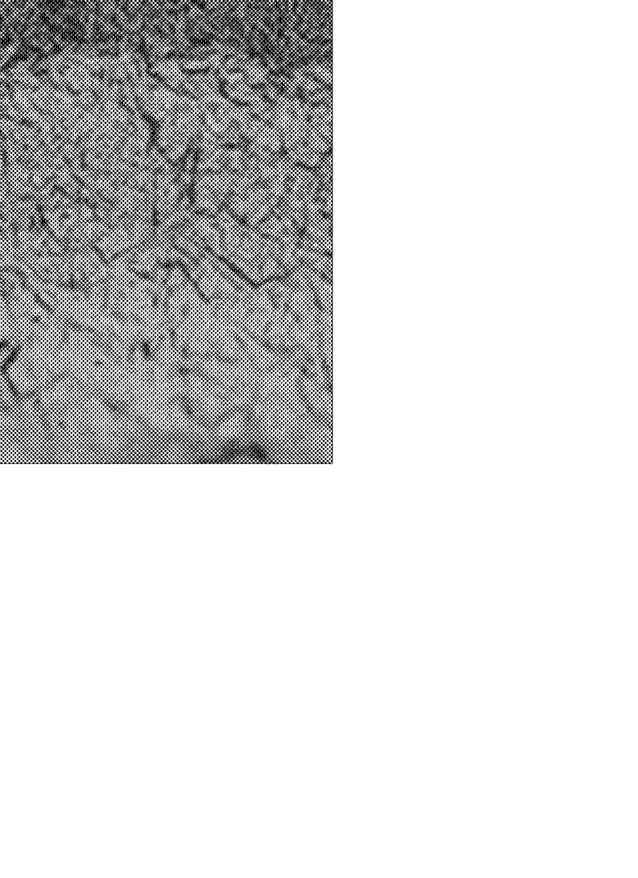
FIG. 5 is a laser microscope image of a fracture surface of the polymer nanofiber structural body after a peeling resistance evaluation in Example 1 of the present invention.

FIG. 5 shows a laser microscope image of the fracture surface of the polymer nanofiber structural body after the performance of the compressed air blowing test. In FIG. 5, the lowermost layer in the vertical direction of the paper surface is the layer A and the uppermost layer in the direction is the layer C. No polymer nanofiber was observed in the layer A and no polymer continuous phase could be observed in the layer C. In addition, a site in which the polymer nanofibers and the polymer continuous phase can be observed is the layer B.

Example 2

A polymer nanofiber structural body was produced in the same manner as in Example 1 with the exception that the voltages applied to the spinning nozzle and the collector, and the application time were changed as shown in Table 1. A fracture surface of the resultant polymer nanofiber structural body was observed with a laser microscope. As a result, the layer A, the layer B, and the layer C were observed in the stated order from a side closer to the collector 17. A polymer continuous phase continuous with the layer A and the layer B, and polymer nanofibers continuous with the layer B and the layer C were also observed. The polymer abundance ratios of the layer A, the layer B, and the layer C clearly satisfied a relationship of (polymer abundance ratio of layer A)>(polymer abundance ratio of layer B)>(polymer abundance ratio of layer C). Table 2 shows the thicknesses of the respective layers, the average fiber diameter, average pore diameter, and polymer abundance ratio of the layer C, and the results of the peeling resistance evaluation. In addition, the compressed air blowing test was performed after an iron cylinder had been set as a support.

Example 3

A polymer nanofiber structural body was produced in the same manner as in Example 1 with the exception that: a solution obtained by dissolving polyvinylidene fluoride (PVDF) in 2-butanone so that a solid content concentration became 20 mass % was used as the polymer solution; and the conditions for the application of the voltages were changed as shown in Table 1. A fracture surface of the resultant polymer nanofiber structural body was observed with a laser microscope. As a result, the layer A, the layer B, and the layer C were observed in the stated order from a side closer to the collector 17. A polymer continuous phase continuous with the layer A and the layer B, and polymer nanofibers continuous with the layer B and the layer C were also observed. The polymer abundance ratios of the layer A, the layer B, and the layer C clearly satisfied a relationship of (polymer abundance ratio of layer A)>(polymer abundance ratio of layer B)>(polymer abundance ratio of layer C). Table 2 shows the thicknesses of the respective layers, the average fiber diameter, average pore diameter, and polymer abundance ratio of the layer C, and the results of the peeling resistance evaluation.

Example 4

A polymer nanofiber structural body was produced in the same manner as in Example 1 with the exception that: a solution obtained by dissolving polymethyl methacrylate (PMMA) in chloroform so that a solid content concentration became 15 mass % was used as the polymer solution; and the conditions for the application of the voltages were changed as shown in Table 1. A fracture surface of the resultant polymer nanofiber structural body was observed with a laser microscope. As a result, the layer A, the layer B, and the layer C were observed in the stated order from a side closer to the collector 17. A polymer continuous phase continuous with the layer A and the layer B, and polymer nanofibers continuous with the layer B and the layer C were also observed. The polymer abundance ratios of the layer A, the layer B, and the layer C clearly satisfied a relationship of (polymer abundance ratio of layer A)>(polymer abundance ratio of layer B)>(polymer abundance ratio of layer C). Table 2 shows the thicknesses of the respective layers, the average fiber diameter, average pore diameter, and polymer abundance ratio of the layer C, and the results of the peeling resistance evaluation.

Comparative Example 1

A polymer nanofiber structural body was produced in the same manner as in Example 1 with the exception that the layer A, the layer B, and the layer C were separately formed and bonded. That is, the layer A was formed on the aluminum foil on the collector 17 under the same conditions as those of the layer A of Example 1. After that, the upper power source 18 and the lower power source 20 were turned off, and the aluminum foil serving as a base material was replaced with a new one. Next, the layer B was formed on the aluminum foil under the same conditions as those of the layer B of Example 1, the upper power source 18 and the lower power source 20 were turned off, the aluminum foil serving as a base material was replaced with a new one, and the layer C was formed under the same conditions as those of Example 1. After the respective layers had been sufficiently dried, the aluminum foil serving as a base material for each layer was peeled, and the layer A, the layer B, and the layer C were stacked and bonded in the stated order. At this time, pressures were applied from both surfaces of the resultant so that the thickness of the layer C did not become 90% or less of the original one, and the layers were bonded while being held at 80° C. for 5 minutes.

A fracture surface of the resultant polymer nanofiber structural body was observed with a laser microscope. As a result, no continuous phase or polymer nanofiber present across the respective layers was observed, but the layer A formed of a polymer continuous phase, the layer B formed of polymer nanofibers and a polymer continuous phase, and the layer C formed of polymer nanofibers were stacked in the order in which the layers were obtained by the treatment. Table 2 shows the thicknesses of the respective layers, the average fiber diameter, average pore diameter, and polymer abundance ratio of the layer C, and the results of the peeling resistance evaluation. As shown in Table 2, in the bending test, peeling occurred at each interface, and in the compressed air blowing test, the layer C formed of the polymer nanofibers peeled.

Comparative Example 2

A polymer nanofiber structural body was produced in the same manner as in Comparative Example 1 with the exception that: a solution obtained by dissolving polyvinylidene fluoride (PVDF) in 2-butanone so that a solid content concentration became 20 mass % was used as the polymer solution; and the conditions for the application of the voltages were changed as shown in Table 1.

A fracture surface of the resultant polymer nanofiber structural body was observed with a laser microscope. As a result, no continuous phase or polymer nanofiber present across the respective layers was observed, but the layer A formed of a polymer continuous phase, the layer B formed of polymer nanofibers and a polymer continuous phase, and the layer C formed of polymer nanofibers were stacked in the order in which the layers were obtained by the treatment. Table 2 shows the thicknesses of the respective layers, the average fiber diameter, average pore diameter, and polymer abundance ratio of the layer C, and the results of the peeling resistance evaluation. As shown in Table 2, in the bending test, peeling occurred at each interface, and in the compressed air blowing test, the layer C formed of the polymer nanofibers peeled.

Comparative Example 3

A polymer nanofiber structural body was produced in the same manner as in Comparative Example 1 with the exception that: a solution obtained by dissolving polymethyl methacrylate (PMMA) in chloroform so that a solid content concentration became 15 mass % was used as the polymer solution; and the conditions for the application of the voltages were changed as shown in Table 1.

A fracture surface of the resultant polymer nanofiber structural body was observed with a laser microscope. As a result, no continuous phase or polymer nanofiber present across the respective layers was observed, but the layer A formed of a polymer continuous phase, the layer B formed of polymer nanofibers and a polymer continuous phase, and the layer C formed of polymer nanofibers were stacked in the order in which the layers were obtained by the treatment. Table 2 shows the thicknesses of the respective layers, the average fiber diameter, average pore diameter, and polymer abundance ratio of the layer C, and the results of the peeling resistance evaluation. As shown in Table 2, in the bending test, peeling occurred at each interface, and in the compressed air blowing test, the layer C formed of the polymer nanofibers peeled.

TABLE 1

|  | Polymer material | Layer A | | | Layer B | | | Layer C | | |
| --- | --- | --- | --- | --- | --- | --- | --- | --- | --- | --- |
|  |  | Applied voltage Spinning nozzle/ collector | Potential difference | Application time | Applied voltage Spinning nozzle/ collector | Potential difference | Application time | Applied voltage Spinning nozzle/ collector | Potential difference | Application time |
| Example 1 | PAI | +10 kV/ −15 kV | 25 kV | 30 min | +13 kV/ −12 kV | 25 kV | 30 min | +20 kV/ −5 kV | 25 kV | 20 min |
| Example 2 | PAI | +10 kV/ −15 kV | 25 kV | 3 min | +13 kV/ −12 kV | 25 kV | 3 min | +20 kV/ −5 kV | 25 kV | 3 min |
| Example 3 | PVDF | +10 kV/ −15 kV | 25 kV | 20 min | +10 kV/ −10 kV | 20 kV | 20 min | +20 kV/ 0 kV | 20 kV | 20 min |
| Example 4 | PMMA | +12 kV/ −12 kV | 24 kV | 20 min | +14 kV/ −10 kV | 24 kV | 20 min | +24 kV/ 0 kV | 24 kV | 20 min |
| Comparative Example 1 | PAI | +10 kV/ −15 kV | 25 kV | 30 min | +13 kV/ −12 kV | 25 kV | 30 min | +20 kV/ −5 kV | 25 kV | 20 min |
| Comparative Example 4 | PVDF | +10 kV/ −15 kV | 25 kV | 20 min | +10 kV/ −10 kV | 20 kV | 20 min | +20 kV/ 0 kV | 20 kV | 20 min |
| Comparative Example 3 | PMMA | +12 kV/ −12 kV | 24 kV | 20 min | +14 kV/ −10 kV | 24 kV | 20 min | +24 kV/ 0 kV | 24 kV | 20 min |

TABLE 2

|  | Layer A Thickness | Layer B Thickness | Layer C | | | | Peeling resistance evaluation | |
| --- | --- | --- | --- | --- | --- | --- | --- | --- |
|  |  |  | Thickness | Average fiber diameter | Average pore diameter | Polymer abundance ratio | Bending test | Compressed air blowing test |
| Example 1 | 80 μm | 90 μm | 100 μm | 700 nm | 1.4 μm | 38% | Good | Good |
| Example 2 | 10 μm | 10 μm | 20 μm | 700 nm | 1.4 μm | 38% | Good | Good |
| Example 3 | 50 μm | 60 μm | 100 μm | 800 nm | 2.0 μm | 32% | Good | Good |
| Example 4 | 50 μm | 60 μm | 90 μm | 600 nm | 2.4 μm | 29% | Good | Good |
| Comparative Example 1 | 80 μm | 90 μm | 100 μm | 700 nm | 1.4 μm | 38% | Bad | Bad |
| Comparative Example 2 | 50 μm | 60 μm | 100 μm | 800 nm | 2.0 μm | 32% | Bad | Bad |
| Comparative Example 3 | 50 μm | 60 μm | 90 μm | 600 nm | 2.4 μm | 30% | Bad | Bad |

As described above by way of the embodiment and Examples, according to the present invention, while effects peculiar to polymer nanofibers are maintained, the polymer nanofibers are prevented from being peeled from a support even by an operation that applies a stress such as bending, and hence various forms of collecting apparatus can be constructed in good yield. In addition, the entirety of the polymer nanofiber structural body of the present invention is formed of the same material. Accordingly, there is no risk that the deformation or breakage of an interface of the structural body occurs owing to a difference in coefficient of thermal expansion even in an environment showing a large temperature change. Thus, the structural body is rich in durability and can be used to construct a collecting apparatus having high reliability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-068823, filed Mar. 28, 2014, which is hereby incorporated by reference herein in its entirety.

What is claimed is:

1. A polymer nanofiber structural body, comprising:
a layer A formed of a polymer continuous phase;
a layer B formed of polymer nanofibers and a polymer continuous phase, which partially fills a space between the polymer nanofibers; and
a layer C formed of polymer nanofibers,
the layer A, the layer B, and the layer C being stacked in the stated order,
wherein:
polymer abundance ratios of the layer A, the layer B, and the layer C satisfy a relationship of (polymer abundance ratio of layer A)>(polymer abundance ratio of layer B)>(polymer abundance ratio of layer C);
the layer C has an average pore diameter of 10 nm to 50,000 nm;
the polymer continuous phase of the layer A, the polymer nanofibers and polymer continuous phase of the layer B, and the polymer nanofibers of the layer C comprise the same polymer material; and
the polymer continuous phase of the layer A is continuous with the polymer continuous phase of the layer B, and at least part of the polymer nanofibers of the layer B are continuous with the polymer nanofibers of the layer C.

2. The polymer nanofiber structural body according to claim 1, wherein the polymer material comprises a polymer material having water resistance.

3. The polymer nanofiber structural body according to claim 1, wherein the polymer material has a melting point of 80° C. or more.

4. The polymer nanofiber structural body according to claim 1, wherein a thickness of the layer C is equal to or more than a thickness of the layer B and equal to or less than 1,000 µm.

5. A method of producing a polymer nanofiber structural body based on an electrospinning method, the method comprising:
  forming a layer A formed of a polymer continuous phase by setting a potential of an ejection portion configured to eject a polymer solution to a positive potential and a potential of a collecting portion to a negative potential with respect to a ground potential, followed by application of a droplet of the polymer solution to the collecting portion;
  subsequent to the forming a layer A, forming a layer B formed of polymer nanofibers and a polymer continuous phase by increasing at least the potential of the collecting portion, followed by application of a droplet of the polymer solution and the polymer nanofibers onto the layer A; and
  subsequent to the forming a layer B, forming a layer C formed of polymer nanofibers by increasing at least the potential of the collecting portion, followed by deposition of the polymer nanofibers onto the layer B.

6. The method according to claim 5, wherein a voltage to be applied between the ejection portion configured to eject the polymer solution and the collecting portion in the steps of forming a layer A, a layer B, and a layer C is constant in each of the steps.

7. The method according to claim 6, wherein the voltage to be applied between the ejection portion configured to eject the polymer solution and the collecting portion in the steps of forming a layer A, a layer B, and a layer C is constant throughout all the steps.

8. An apparatus for collecting fine particles, comprising the polymer nanofiber structural body of claim 1, wherein the polymer nanofiber structural body is formed into a shape of a cylinder so that the layer C is positioned on an inner side of the cylinder.

9. A polymer nanofiber structural body, comprising:
  a polymer serving as a continuous phase; and
  polymer nanofibers,
  wherein:
    the polymer nanofiber structural body continuously includes a layer A, a layer B, and a layer C stacked in the stated order;
    the layer A includes the polymer serving as a continuous phase and is free of the polymer nanofibers;
    the layer B includes the polymer serving as a continuous phase and includes the polymer nanofibers;
    the layer C is free of the polymer serving as a continuous phase and includes the polymer nanofibers;
    the polymer serving as a continuous phase and the polymer nanofibers comprise the same polymer material;
    the layer C includes the polymer nanofibers extending from the layer B; and
    the layer C has an average pore diameter of 10 nm to 50,000 nm.

10. The polymer nanofiber structural body according to claim 1, wherein the average pore diameter of the layer C is 10 nm to 10,000 nm.

11. The polymer nanofiber structural body according to claim 1, which comprises at least one of polyamide imide, polymethyl methacrylate, and polyvinylidene fluoride as the polymer material.

12. The polymer nanofiber structural body according to claim 1, wherein the polymer continuous phase of the layer A is continuous with the polymer continuous phase of the layer B whereby the layer A and the layer B are in close contact with each other, and wherein at least part of the polymer nanofibers of the layer B is continuous with the polymer nanofibers of the layer C whereby the layer B and the layer C are in close contact with each other.

* * * * *